US007450004B2

(12) United States Patent
Allen et al.

(10) Patent No.: US 7,450,004 B2
(45) Date of Patent: Nov. 11, 2008

(54) SYSTEMS AND METHODS FOR HANDLING INFORMATION FROM WIRELESS NODES, INCLUDING NODES FOR COMMUNICATION WITH AIRCRAFT

(75) Inventors: David L. Allen, Seattle, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 772 days.

(21) Appl. No.: 10/976,662

(22) Filed: Oct. 29, 2004

(65) Prior Publication Data

US 2006/0094417 A1  May 4, 2006

(51) Int. Cl.
  *G08B 1/08* (2006.01)
  *G06F 19/00* (2006.01)
  *G01S 13/00* (2006.01)
(52) U.S. Cl. .................. 340/539.22; 340/963; 340/981; 701/120; 342/36; 342/63
(58) Field of Classification Search ............ 340/539.22, 340/539.26, 972, 963, 981–983; 701/120; 342/32, 36, 63, 398
  See application file for complete search history.

(56) References Cited

U.S. PATENT DOCUMENTS

| 5,629,691 | A  | * | 5/1997  | Jain ........................... 340/961 |
| 5,835,059 | A  | * | 11/1998 | Nadel et al. ................. 342/398 |
| 6,246,320 | B1 | * | 6/2001  | Monroe ....................... 340/506 |
| 6,337,652 | B1 | * | 1/2002  | Shiomi et al. ................ 342/37 |
| 6,437,692 | B1 |   | 8/2002  | Petite et al. |
| 6,486,825 | B1 | * | 11/2002 | Smithey ....................... 342/29 |
| 6,606,035 | B2 | * | 8/2003  | Kapadia et al. ............. 340/972 |
| 6,917,309 | B2 | * | 7/2005  | Nitzan et al. ................ 340/945 |
| 2003/0069648 | A1 | | 4/2003  | Douglas et al. |
| 2004/0148088 | A1 | | 7/2004  | Davis et al. |

FOREIGN PATENT DOCUMENTS

| WO | WO-01/01366  | 1/2001  |
| WO | WO-03/098908 | 11/2003 |

OTHER PUBLICATIONS

International Search Report and Written Opinion for PCT/US2005/035564; The Boeing Company; Dec. 14, 2006; European Patent Office; 14 pgs.
Understanding the Lightweight Access Point Protocol (LWAPP), A Technical Note, (2003), 5 pgs, airespace, San Jose, California.

* cited by examiner

*Primary Examiner*—Toan N Pham
(74) *Attorney, Agent, or Firm*—Perkins Coie LLP

(57) ABSTRACT

Systems and methods for handling information from wireless nodes, including nodes for communication with aircraft, are disclosed. A system in accordance with one aspect of the invention includes a sensor configured to sense information corresponding to a characteristic of a wireless node. The wireless node can be one of a plurality of wireless nodes configured to transmit and receive wireless signals. The wireless nodes can also be linked to a non-wireless network portion. The system can further include a transmitter configured to transmit the information via the network, and a receiver operatively coupled to the transmitter to receive the information via the network. Accordingly, the system can be used to automatically identify and track diagnostic information corresponding to the state of one or more wireless nodes.

16 Claims, 4 Drawing Sheets

SYSTEMS AND METHODS FOR HANDLING INFORMATION FROM WIRELESS NODES, INCLUDING NODES FOR COMMUNICATION WITH AIRCRAFT

TECHNICAL FIELD

The present invention is directed generally toward systems and methods for handling information from wireless nodes, including nodes for communication with aircraft.

BACKGROUND

Commercial airlines are under continual pressure to streamline operations in order to make more efficient use of their aircraft. One way to streamline operations has been to increase the speed with which information is transmitted between aircraft and ground-based stations. The ground-based stations can include maintenance facilities, operational headquarters, and other organizations that use information (e.g., including statistical data associated with each flight) so as to plan maintenance procedures, improve aircraft routing, improve fuel efficiency, and improve other aspects of aircraft operation. Ground-based facilities can also transmit information to the aircraft, including data associated with upcoming or just-completed flights.

One approach for increasing the speed with which information is transmitted between an aircraft and ground-based systems is to place wireless transmitter/receivers at an airport and then link the transmitters/receivers to a hard-wired network (e.g., the Internet). An advantage of this "wi-fi" arrangement is that it allows aircraft to transmit and receive valuable data while taxiing at the airport and when parked at an aircraft gate. One feature of this arrangement is that the wireless transmitters/receivers are typically located out-of-doors and in close proximity to the aircraft, so as to have reliable, line-of-sight links to the aircraft, despite the movement of the aircraft, the presence of other aircraft, and the presence of intervening structures, including bulky, odd-shaped airport equipment. A drawback of this arrangement is that the transmitters/receivers may be exposed to hostile environmental conditions that may cause the devices to fail and/or require maintenance more often than more typical wi-fi devices that are located indoors. Furthermore, as a result of the close proximity of the transmitters/receivers to aircraft taxiways, runways and gate aprons, it can be difficult to gain access to the transmitters/receivers while still complying with airport security measures and while not interfering with aircraft operations.

SUMMARY

The following summary is provided for the benefit of the reader and is not intended to limit the scope of the invention, which is defined by the claims. The present invention is directed generally toward systems and methods for handling information from wireless nodes, including nodes for communication with aircraft. A method in accordance with one aspect of the invention for handling information about an information network includes sensing information corresponding to a characteristic of a wireless node. The wireless node can be one of a plurality of wireless nodes that are in operational use, and that are configured to transmit and receive wireless signals. The method can further include transmitting the information corresponding to the characteristics of the wireless node. In particular aspects of the invention, the sensed information can correspond to the status of a radio, power supply, filter, media converter, and/or housing positioned around these components. The information can be transmitted via a non-wireless portion of the network, or in a wireless manner from one wireless node to another. The sensed information can include a current or voltage level associated with one or more of the components, a temperature and/or humidity of the interior of the enclosure in which the components are housed, and/or a position of a door that provides access to the enclosure.

In further aspects of the invention, the information can be automatically received and provided for access at a database. The information can be received over a period of time, and the method can further comprise organizing the information to present time-dependent trends associated with the information. In still further aspects of the invention, the information can be reviewed to isolate a fault at the wireless node, and the wireless node can be serviced based on the information.

Systems in accordance with further aspects of the invention can include a sensor configured to sense information corresponding to a characteristic of a wireless node, wherein the wireless node is one of a plurality of wireless nodes configured to transmit and receive wireless signals. The wireless nodes can be linked to a non-wireless network. The system can further include a transmitter configured to transmit the information via the non-wireless network, and a receiver operatively coupled to the transmitter to receive the information via the non-wireless network.

DETAILED DESCRIPTION

The present disclosure describes systems and methods for handling information from wireless nodes, including nodes placed at an airport for communication with aircraft. Certain specific details are set forth in the following description and in FIGS. 1-4 to provide a thorough understanding of various embodiments of the invention. Well-known structures, systems and methods often associated with these systems have not been shown or described in detail to avoid unnecessarily obscuring the description of the various embodiments of the invention. In addition, those of ordinary skill in the relevant art will understand that additional embodiments of the invention may be practiced without several of the details described below.

Many embodiments of the invention described below may take the form of computer-executable instructions, including routines executed by a programmable computer. Those skilled in the relevant art will appreciate that the invention can be practiced on computer systems other than those shown and described below. The invention can be embodied in a special-purpose computer or data processor that is specifically programmed, configured or constructed to perform one or more of the computer-executable instructions described below.

Accordingly, the term "computer" as generally used herein refers to any data processor and can include Internet appliances, hand-held devices (including palm top computers, wearable computers, cellular or mobile phones, multi-processor systems, processor-based or programmable consumer electronics, network computers, mini-computers and the like). Information presented by these computers can be presented at any suitable display medium, including a CRT display or LCD.

The invention can also be practiced in distributed computing environments, where tasks or modules are performed by remote processing devices that are linked through a communications network. In a distributed computing environment, program modules or subroutines may be located in local and remote memory storage devices. Aspects of the invention described below may be stored or distributed on computer-readable media, including magnetic or optically readable or removable computer disks, as well as distributed electronically over networks. Data structures and transmissions of data particular to aspects of the invention are also encompassed within the scope of the invention.

Figure 1:
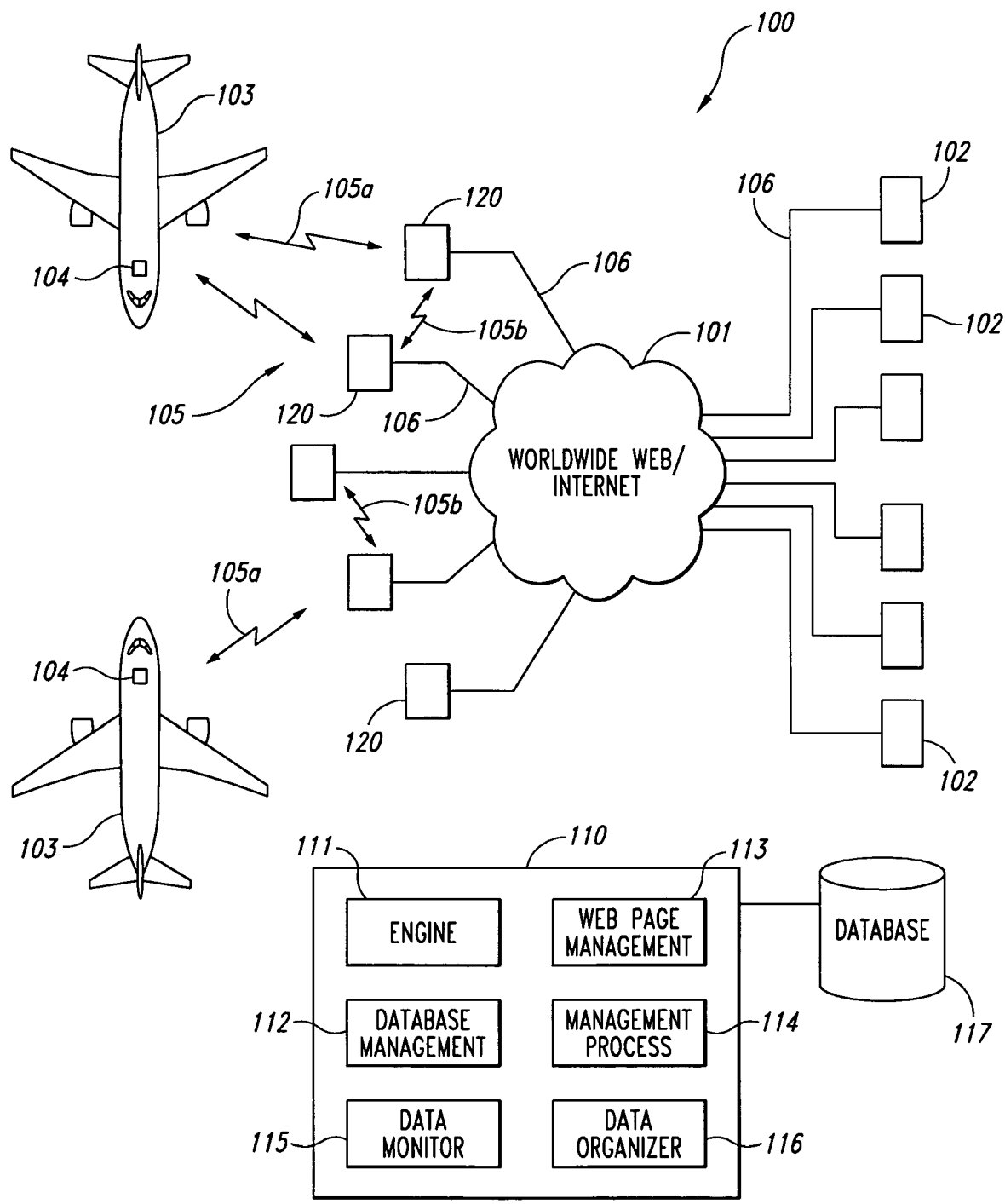
FIG. 1 is a partially schematic illustration of a system for handling information from wireless nodes in accordance with an embodiment of the invention.

FIG. 1 illustrates a system 100 that links airline computers 102 with aircraft computers 104. The airline computers 102 can include maintenance computers, operations computers, planning computers, and/or other computers associated with the operation of an airline, air force, or other organization that uses aircraft. The aircraft computers 104 can be housed in aircraft 103 and can transmit and receive information corresponding to operations of the aircraft 103. Accordingly, the airline or other aircraft operator can receive valuable data from the aircraft 103 for planning maintenance activities, scheduling aircraft, and/or improving overall operations. The crew aboard the aircraft 103 can receive valuable information, including weather updates, gate information, and upcoming maintenance activities, all of which the flight crew can use to improve the efficiency with which they operate the aircraft 103.

The information transmitted between the airline computers 102 and the aircraft computers 104 can be transmitted via a network 101 (e.g., the worldwide web, or Internet), and can be managed by a server computer 110. Portions of the network 101 can include non-wireless links 106 (e.g., copper cable or fiber optic links). However, because the aircraft 103 are in motion, portions of the network 101 can also include wireless links 105. Nodes 120 (e.g., nodes distributed out-of-doors around an airport) can provide a coupling between the wireless links 105 and the non-wireless links 106. Accordingly, the wireless links 105 can include first links 105a between the aircraft 103 and the wireless nodes 120. The wireless nodes 120 can also communicate with each other via second wireless links 105b. At least the first links 105a (and optionally the second links 105b) can be broadband, high-speed links, so as to provide rapid data transfer on the network 101.

During normal operations, the network 101 can transmit data back and forth between the airline computers 102 and the aircraft computers 104. In a particular embodiment of the present invention, the network 101 can also transmit information corresponding to characteristics of the wireless nodes 120. For example, the network 101 can transmit information corresponding to the operational states of each of the wireless nodes 120. Accordingly, the server computer 110 can include features for handling the aircraft/airline information transmitted between the airline computers 102 and the aircraft computers 104, as well as features for handling diagnostic information pertaining to the wireless nodes 120. In an embodiment shown in FIG. 1, the server computer 110 can include a server engine 111, a web page management component 113, a database management component 112, and a management process component 114. Information can be transmitted between the server computer 110 and a database 117. The server computer 110 can further include a data monitor 115 and a data organizer 116, both of which are configured to handle information corresponding to the status of the wireless nodes 120. This and other information can be stored at the database 117 for access by the server computer 110 and other computers coupled to the network 101. Further details of the wireless nodes 120 and the corresponding information pertaining to the wireless nodes 120 are described below.

Figure 2:
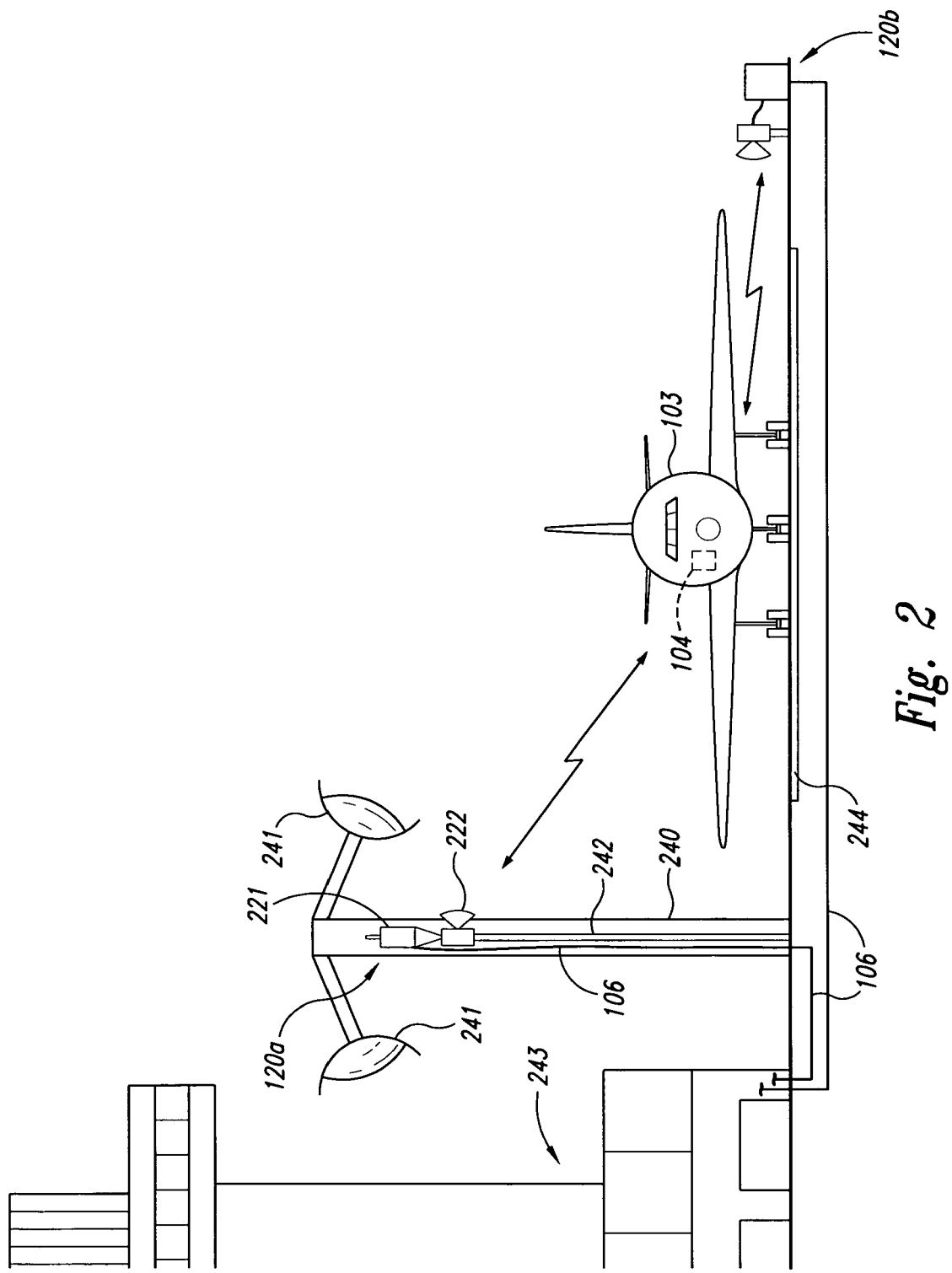
FIG. 2 is a partially schematic illustration of a wireless node positioned to transmit and receive information associated with an aircraft.

FIG. 2 illustrates in an aircraft 103 positioned proximate to two wireless nodes 120 (shown as a first wireless node 120a and a second wireless node 120b). The first wireless node 120a can be positioned on a light pole 240. Accordingly, in addition to supporting multiple light fixtures 241, the light pole 240 can support a transmitting/receiving antenna 222 and an enclosure 221 that protects components required to transmit and receive wireless signals. The enclosure 221 can be coupled to the non-wireless link 106 and can be located on a track 242 that allows the enclosure 221 to be easily removed for maintenance without requiring tall servicing equipment. In some embodiments, the enclosure 221 can be positioned from about 30 feet to about 70 feet above the ground. An advantage of positioning the first wireless node 120a at this height is that it can increase the likelihood that signals transmitted to and received from the antenna 222 will be unaffected by adjacent structures, including aircraft terminal structures 243 and aircraft other than the aircraft 103 that sends and receives the wireless signals handled by the first wireless node 120a.

The second wireless node 120b can be positioned closer to the ground when it is located a sufficient distance away from potentially interfering structures, including the terminal structures 243. For example, in some embodiments, the second wireless node 120b can be located near aircraft runways or taxiways 244. Because wireless nodes 120 having remote locations (like those of the first node 120a and the second node 120b) are relatively inaccessible, they can include sensors and associated equipment for tracking the states of the components comprising the nodes 120. Further details of these arrangements are described below with reference to FIG. 3.

Figure 3:
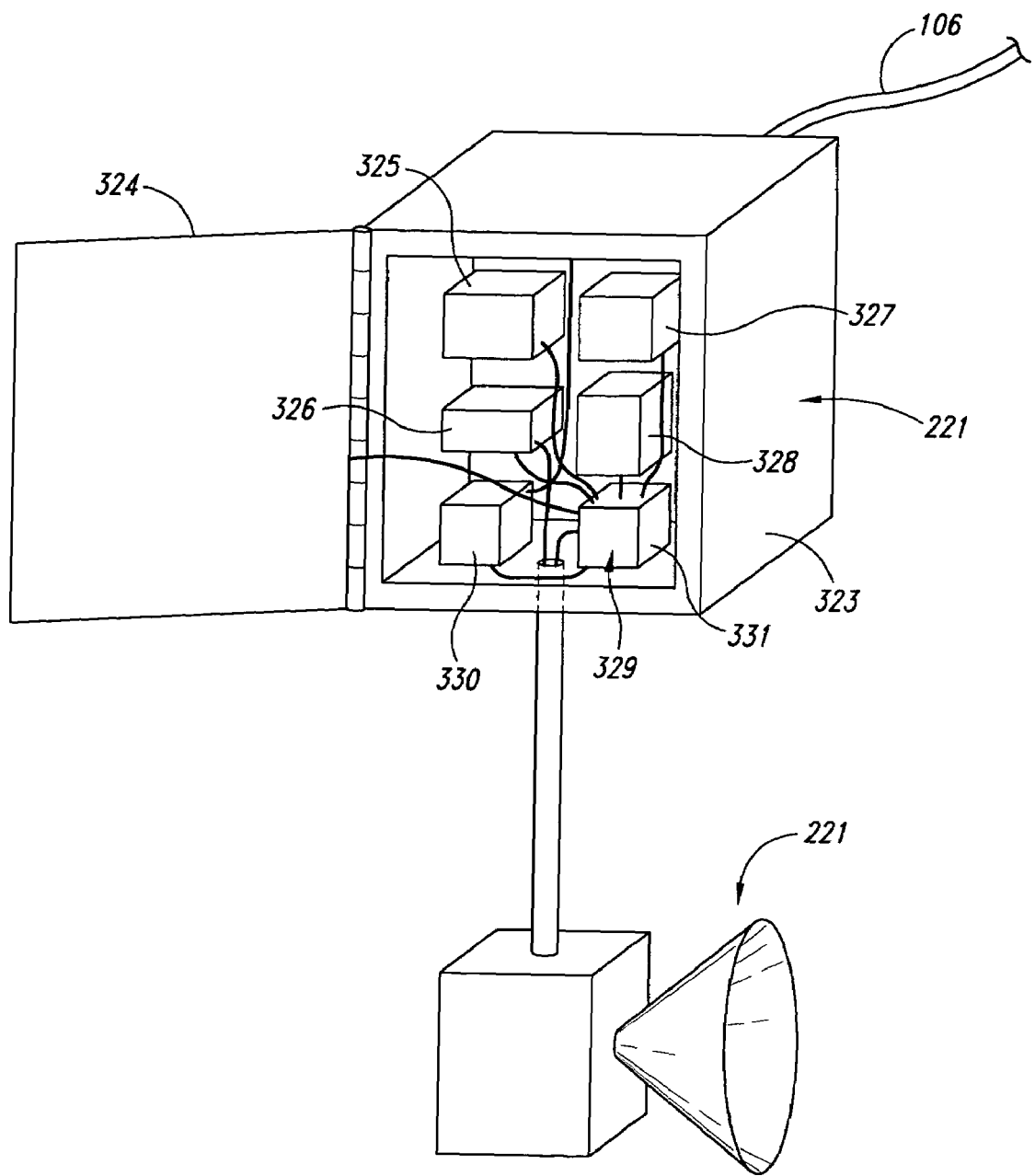
FIG. 3 is a partially schematic, enlarged view of a wireless transmitting/receiving node and sensor, configured in accordance with an embodiment of the invention.

FIG. 3 schematically illustrates an enclosure 221 generally similar to enclosures 221 described above with reference to FIG. 2. The enclosure 221 can include a weather-resistant box 323 and an access door 324 that is movable relative to the box 323 to provide access to the components inside. In a particular embodiment, the enclosure 221 can include a NEMA enclosure (e.g., an enclosure that conforms to standards promulgated by the National Electrical Manufacturer Association). The components inside the enclosure 221 can include a two-way radio 326 (e.g., transmitter and receiver), a power supply 325 that provides power to the radio 326, a filter 327 that filters signals transmitted and/or received by the radio 326, and a media converter 328 that converts wireless signals transmitted and received by the radio 326 to non-wireless signals for transmission over the non-wireless link 106. For purposes of clarity, interconnections between most of the components are not shown in FIG. 3. These components are commercially available from suppliers including Kyocera of Kyota, Japan; Honeywell of Morristown, N.J.; Molex of Lisle, Ill.; and Texas Instruments of Dallas, Tex.

The enclosure 221 can also house one or more sensors 329 (represented schematically and for purposes of illustration as a sensor module 331 that includes one or more sensors 329).

The sensor module 331 can be configured to detect information corresponding to any or all of the components located in the enclosure 221, and/or characteristics of the enclosure 221 itself. For example, the sensor module 331 can be configured to determine current and/or voltage levels associated with any of the components, and/or any engineering values (e.g., power) that are based on current and/or voltage. The sensor module 331 can also be configured to detect a temperature within the enclosure 221 and/or a temperature of any of the components in the enclosure 221, a humidity within the enclosure 221, and/or any other characteristic of the enclosure 221 (e.g., the constituents of a gas within the enclosure 221). The sensor module 331 can also be configured to detect a status of the door 324 that covers the enclosure 221. For example, the sensor module 331 can include a switch configured to detect whether or not the door 324 is open. In still further embodiments, the sensor module 331 can also detect a state of the antenna 221 and/or the non-wireless link 106.

As discussed above, FIG. 3 schematically illustrates a single sensor module 331 that includes one or more sensors 329, with each sensor coupled to a corresponding device and/or otherwise positioned to detect a characteristic of some part of the node 221. In other embodiments, the sensors can be integrated with the devices they monitor, and/or a single sensor can monitor multiple devices. In any of the foregoing embodiments, the sensor(s) 329 can be coupled to a transmitter 330. The transmitter 330 can be configured to receive raw data from the sensor(s) 329 and convert the data to a format that is compatible with the non-wireless link 106, the server computer 110 (FIG. 1), and/or the airline computers 102 (FIG. 1). For example, in particular embodiments, the transmitter 330 can include a processor (e.g., a microprocessor) and software that automatically perform the conversion and transmission process. In other embodiments, the transmitter 330 can include other hardware and/or software components. Accordingly, the sensor(s) 329 can obtain diagnostic information corresponding to the status of the wireless node 120 while the node 120 is in operational use (e.g., installed and coupled to the network 101 shown in FIG. 1, whether or not the node 120 is actually transmitting or receiving data). The transmitter 330 can transmit this information over the network 101 (e.g., via the non-wireless link 106). A corresponding receiver (e.g., located at the server computer 110 and/or the airline computers 102 described above with reference to FIG. 1) can receive and/or process the information.

In another embodiment, for example, when the non-wireless link 106 itself is damaged, the transmitter 330 can be configured to transmit diagnostic information via the antenna 221. Accordingly, the transmitter 330 can provide notification to the server computer 110 that the non-wireless link 106 is damaged, and, if other components within the enclosure 221 are also damaged, the transmitter 330 can provide diagnostic information pertaining to those components as well. In yet another embodiment, the entire network 101 (FIG. 1), or at least the portion of the network 101 between the nodes 120 and the server computer 110 can be wireless. Accordingly, the diagnostic information can be transmitted wirelessly to the server computer 110 and/or other receivers.

Figure 4:
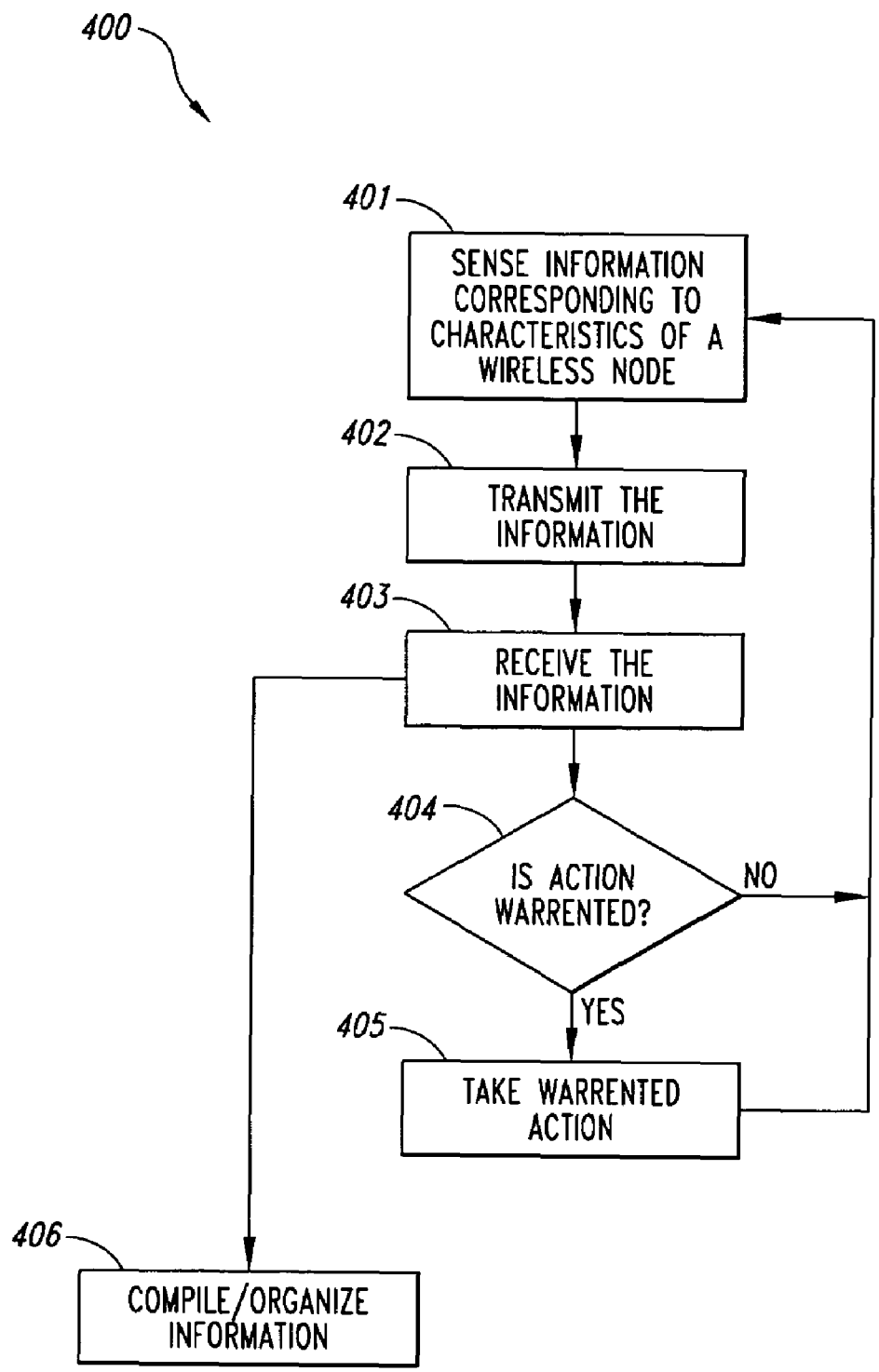
FIG. 4 is a flow diagram illustrating a method for handling information corresponding to characteristics of a wireless node in accordance with an embodiment of the invention.

FIG. 4 is a flow diagram illustrating a process 400 for handling information corresponding to wireless nodes, in accordance with an embodiment of the invention. In process portion 401, the process 400 includes sensing information corresponding to a characteristic of a wireless node. As described above, the characteristic can include diagnostic information associated with components that form the node, including electronic components and/or mechanical components. In process portion 402, the information is transmitted.

For example, the information can be transmitted over a non-wireless link or a wireless link to a server computer. In process portion 403, the information is received (e.g., at the server computer). In process portion 404, a determination is made as to whether an action is warranted, based on the information received in process portion 403. For example, the information received in process portion 403 can be used to isolate faults associated with the wireless node. In particular, the information can be used to determine whether any one of the components at the node has failed, and/or whether failure, or an unacceptably degraded performance of any of the components is upcoming and/or imminent. If an action is warranted, the action can be taken in process portion 405. Such an action may include scheduling maintenance for the affected node, shutting the affected node down, obtaining parts required to repair the affected node, and/or completing repairs. If no action is required, the process 400 returns to process portion 401.

In particular embodiments, the information received in process portion 403 can be compiled and/or organized in process portion 406. For example, process portion 406 can include associating the information with the affected node, tracking historical data associated with the affected node (and other nodes), and/or other methodologies for making use of the diagnostic information received in process portion 403. In a particular example, the voltage, current, temperature, and/or humidity values detected by the sensors can be correlated with the strength of signals provided by the nodes. This information can be used to predict when signal strength may fall below acceptable levels, and can allow the operator to schedule maintenance accordingly.

One feature of embodiments of the systems and methods described above with reference to FIGS. 1-4 is that they can be arranged to automatically provide information about the health or other status of wireless nodes in a harsh and/or inaccessible environment, including, but not limited to, outdoor airport locations. One advantage of this arrangement is that the node itself need not be physically accessed to ascertain this information. Instead, a server computer and/or other computer (e.g., the airline computers 102) can be used to monitor this information and can automatically provide prompts to operators identifying the affected node, the information associated with the affected node, and/or a proposed response. Accordingly, the nodes may not need to be serviced on a regular maintenance schedule, but can instead be serviced only when necessary. When service is required, the information provided by the sensor(s) can be used to isolate faults or at least narrow the list of potentially faulty components. This can reduce the amount of time required to service the components, and can reduce the degree to which such service interferes with surrounding operations (e.g., airport operations).

Another advantage of the foregoing feature is that the sensors can be used to predict an upcoming failure. For example, if over the course of time the data indicate that a power supply that fails to provide a power level above a threshold level for a given period of time is likely to fail, the operator can take preventative action by (a) monitoring the power supply, and (b) replacing the power supply in a deliberately scheduled service call before the power supply fails. By taking preventative action, the operator can reduce down-time by scheduling maintenance for a time when security checks are easier to make (e.g., at times during which the airport is not busy) and/or when aircraft traffic is relatively light. As a result of this preventative action, the amount of time that the node will be without power can be significantly reduced because the power will be shut down for only as long as it takes to replace the power supply. This is unlike existing arrangements in which, after a power supply fails, the operator must schedule a time for accessing the node, must pass through multiple security levels to access the node, must wait for aircraft traffic to diminish enough to allow access to the nodes, and must then spend time diagnosing the problem.

From the foregoing, it will be appreciated that specific embodiments of the invention have been described herein for purposes of illustration, but that various modifications may be made without deviating from the spirit and scope of the invention. For example, aspects of the invention were described above in the context of airport installations, but may also be applied in other outdoor environments (e.g., cellular telephone networks), and/or indoor environments. Aspects of the invention described in the context of particular embodiments may be combined or eliminated in other embodiments. For example, method portions described in the context of a server computer can be performed by other computers in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. A method for handling information about an information network, located at least in part at an airport, the method comprising:

sensing a state of at least one component of an outdoor wireless node while the wireless node is in operational use, wherein the outdoor wireless node is one of a plurality of outdoor wireless nodes that are located at an airport and that are coupled to a non-wireless network portion, the outdoor wireless node including a radio having a wireless transmitter and a wireless receiver, a power supply coupled to the radio, a media converter coupled to the radio, a link coupled between the radio and the non-wireless network portion, and an environmental enclosure disposed around the radio, the media converter and the power supply;

transmitting information corresponding to the state of the at least one component over the non-wireless network portion via the link to a server computer; and based on the information received at the server computer, determining a maintenance procedure to perform on the outdoor node.

2. The method of claim 1, further comprising transmitting information corresponding to aircraft operations via the non-wireless network portion.

3. The method of claim 1 wherein sensing information includes sensing information corresponding to a characteristic of at least one of the radio, the power supply, a filter, the media converter, the housing, and a volume within the housing.

4. The method of claim 1 wherein transmitting the information includes transmitting the information in a wireless manner from the one wireless node to another of the plurality of wireless nodes.

5. The method of claim 1 wherein sensing information includes sensing at least one of a current and a voltage.

6. The method of claim 1 wherein sensing includes sensing at least one of a temperature and a humidity of an interior of the enclosure.

7. The method of claim 1 wherein the enclosure includes an access door, and wherein sensing includes sensing a position of the access door.

8. The method of claim 1 wherein sensing includes sensing diagnostic information indicative of how the node is functioning.

9. The method of claim 1 wherein transmitting information includes transmitting information over a period of time, and wherein the method further comprises organizing the information to present time-dependent trends.

10. The method of claim 1, further comprising providing the information for review to isolate a fault at the node.

11. The method of claim 1, further comprising providing the information for review to isolate a fault at the node and service the node.

12. A system for providing wireless communications at an airport, comprising:

multiple wireless nodes located outside a terminal building at an airport, each wireless node including an enclosure, a wireless transmitter and wireless receiver located within the enclosure, and at least one sensor located within the enclosure and configured to sense diagnostic information corresponding to a characteristic of the wireless node while the wireless node is in operational use;

a non-wireless network portion coupled to each of the wireless nodes;

multiple aircraft that are movable to and from the airport and that each include an aircraft computer in wireless communication with the wireless nodes when the aircraft are at least proximate to the airport; and a server computer coupled to the network to receive the diagnostic information via the network.

13. The system of claim 12, further comprising an airline maintenance computer coupled to the network.

14. The system of claim 12 wherein the sensor is configured to sense at least one of a temperature and a humidity of an interior of the enclosure in which components of the wireless node are housed.

15. The system of claim 12 wherein the sensor is configured to sense at least one of a current and a voltage of a component of the wireless node.

16. The system of claim 12 wherein the enclosure includes an access door, and wherein the sensor is configured to sense a position of the access door.

* * * * *

UNITED STATES PATENT AND TRADEMARK OFFICE
CERTIFICATE OF CORRECTION

PATENT NO. : 7,450,004 B2  
APPLICATION NO. : 10/976662  
DATED : November 11, 2008  
INVENTOR(S) : Allen et al.

Page 1 of 1

It is certified that error appears in the above-identified patent and that said Letters Patent is hereby corrected as shown below:

On Sheet 1 of 4, line 1, Box 110, below "Box 110" insert -- Fig. 1 --.

In column 4, line 63, delete "Kyota" and insert -- Kyoto --, therefor.

Signed and Sealed this

Twenty-sixth Day of May, 2009

JOHN DOLL
*Acting Director of the United States Patent and Trademark Office*